United States Patent
Siminoff

(10) Patent No.: US 9,210,264 B2
(45) Date of Patent: Dec. 8, 2015

(54) SYSTEM AND METHOD FOR LIVE VOICE AND VOICEMAIL DETECTION

(71) Applicant: James Siminoff, Pacific Palisades, CA (US)

(72) Inventor: James Siminoff, Pacific Palisades, CA (US)

(73) Assignee: NobelBiz, Inc., Carlsbad, CA (US)

( * ) Notice: Subject to any disclaimer, the term of this patent is extended or adjusted under 35 U.S.C. 154(b) by 0 days.

(21) Appl. No.: 13/916,187

(22) Filed: Jun. 12, 2013

(65) Prior Publication Data

US 2014/0369479 A1  Dec. 18, 2014

(51) Int. Cl.
*H04M 1/64* (2006.01)
*H04M 3/51* (2006.01)
*H04M 3/523* (2006.01)

(52) U.S. Cl.
CPC .......... *H04M 3/5158* (2013.01); *H04M 3/5235* (2013.01)

(58) Field of Classification Search
CPC ..... H04M 3/51; H04M 7/0027; H04M 3/493; H04M 3/5175; H04M 3/533; H04M 2201/36; H04M 2203/4545; H04M 3/5166; H04M 3/5237; H04M 3/36; H04M 3/42323; H04M 3/5232; H04M 2242/22; H04M 3/42059; H04M 3/487; H04M 3/5235; H04M 3/527; H04M 15/00; H04M 15/42; H04M 2201/40; H04M 1/271; H04M 3/523; H04M 3/5125; H04M 3/5191; H04M 3/5158; H04M 3/5233; H04M 1/57; H04M 3/58; H04M 3/48; G06Q 10/06; H04N 1/00281; H04L 12/58
USPC ................ 379/67.1, 100.01, 142.07, 210.01, 379/212.01, 88.19, 88.22, 88.01–88.04, 379/265.01–266.02, 93.24, 100.08, 88.14, 379/93.15, 100.13, 142.14, 353
See application file for complete search history.

(56) References Cited

U.S. PATENT DOCUMENTS

| | | | |
|---|---|---|---|
| 5,404,400 A * | 4/1995 | Hamilton ...................... | 379/386 |
| 6,226,360 B1 * | 5/2001 | Goldberg et al. ............... | 379/69 |
| 8,606,245 B1 * | 12/2013 | Eccelston et al. .......... | 455/414.1 |
| 2006/0233325 A1 * | 10/2006 | Wu et al. .................... | 379/88.13 |
| 2006/0256945 A1 * | 11/2006 | Noble, Jr. ................. | 379/211.02 |
| 2014/0241520 A1 * | 8/2014 | Stubbe-Ostergaard .. | 379/265.09 |

* cited by examiner

*Primary Examiner* — Akelaw Teshale
(74) *Attorney, Agent, or Firm* — White and Williams LLP

(57) ABSTRACT

A computer system for processing audio on a call having a processor in communication with non-volatile memory having code for converting recorded audio into a vector, comparing the recorded audio vector with a plurality of audio vectors and generating a comparative match number for each comparison, identifying a closest audio vector having a highest comparative match number above a predetermined threshold match number, connecting the call to an agent when the closest audio vector is designated as live-voice.

18 Claims, 3 Drawing Sheets

SYSTEM AND METHOD FOR LIVE VOICE AND VOICEMAIL DETECTION

BACKGROUND OF THE INVENTION

Call centers use predictive dialers to increase the amount of time agents spend on the phones engaging with customers. Predictive dialers are telecommunication systems employing an automatic call distributor having a multiport switch controlled by a central control processing unit in conjunction with a main memory for selectively interconnecting outbound telephone calls answered by customers with agents within the network. Predictive dialers dial a list of telephone numbers and connect answered calls to agents. Predictive dialers use statistical algorithms to minimize the time that agents spend waiting between conversations, while minimizing the occurrence of someone answering when no agent is available. A variety of features and upgrades have been added to these systems to maximize the efficiency of the call center. Prior to predictive dialers, agents spoke to customers about 66 percent of time, while the rest of the time was spent dialing numbers and waiting for responses. Predictive dialers handle dialing tasks, thereby allowing agents to speak to customers as much as 95 percent of the time. Call centers wish to continue to improve performance by reducing further an agent's idle time. One way in which call centers are capable of reducing an agent's idle time is by interpreting data faster than they have before, or by interpreting data using different methods, which allow call centers to be proactive, rather than reactive.

One example of a time reducing feature is answering machine detection. It works by determining the difference between a pre-recorded voice reproduced by an answering machine, and a live voice. There are several methods used to identify pre-recorded voice and live audio. The primary method used by call centers is by employing devices that have separate timers to track pauses in audio. A large pause after the initial greeting word may indicate live voice. A shorter pause after the initial greeting word may indicate the prerecorded voice asking the caller to leave a message. In known answering machine detection systems, a first timer, sometimes called the greeting timer, is triggered upon detection of the initial audio signal. A second timer, called the pause timer, is triggered upon detection of an absence of an audio signal and runs for a predetermined time after the initial audio signal is detected. If there is no elongated pause, or the pause time from the initial voice detection is less than the preselected pause time period, then the pause timer does not expire, and the greeting timer will expire first. If the greeting timer expires before the pause timer, then the length of a pause has not met the preselected period of time, and thus an answering machine is determined to be present.

A timer-based detection system may not properly characterize an answering machine or live voice causing at least two undesirable outcomes. The first undesirable outcome occurs when the detection system mistakes live-voice from a customer as an answering machine and terminates the call, resulting in the customer receiving a silent or abandoned call. Call centers may have limits on the acceptable number or percentage of outbound silent calls based on call regulations, and call centers may be penalized or fined when they exceed those limits.

The second undesirable result occurs when the detection system mistakes an answering machine for live-voice. This occurs when the detection system encounters a recorded message with a long initial pause and, rather than dispose of the call, instead distributes the call to an agent, thereby wasting the agent's time and decreasing the accuracy of the call center.

SUMMARY OF THE INVENTION

A computer system for processing audio on a call having a processor in communication with non-volatile memory having code for converting recorded audio into a vector, comparing the recorded audio vector with a plurality of audio vectors and generating a comparative match number for each comparison, identifying a closest audio vector having a highest comparative match number above a predetermined threshold match number, connecting the call to an agent when the closest audio vector is designated as live-voice.

DETAILED DESCRIPTION OF THE DRAWINGS

Figure 1:
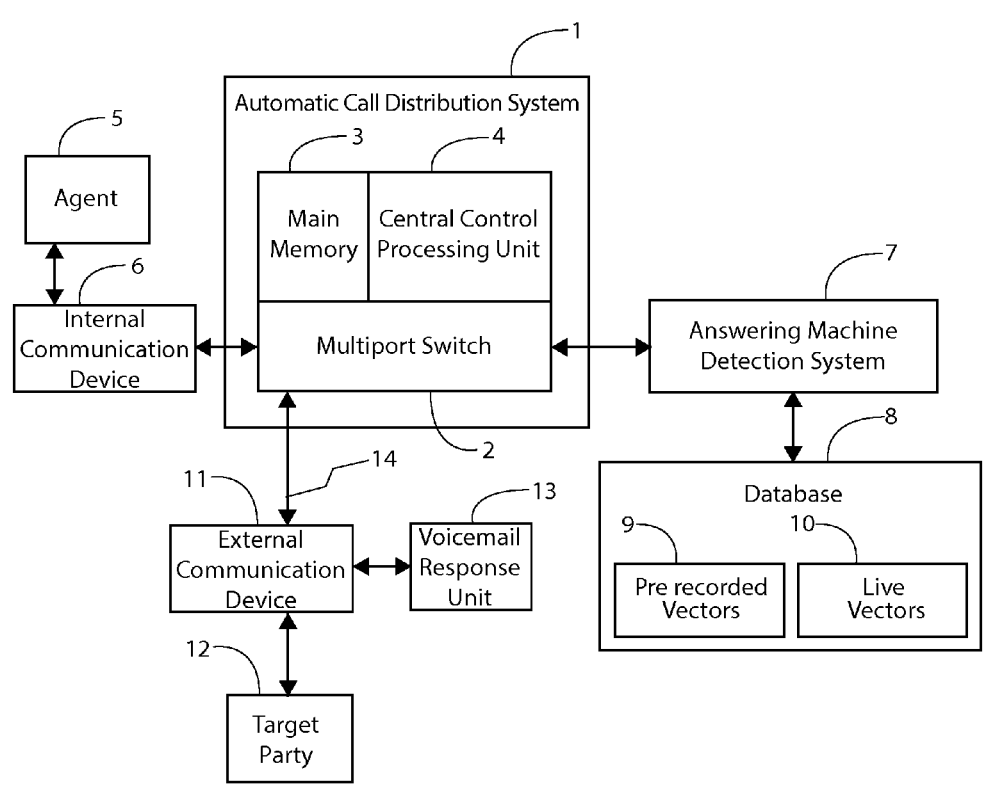
FIG. 1 is an end to end view of an automatic call distribution system coupled to an answering machine detection system according to one aspect of the system and method of present disclosure.

FIG. 1 is an end to end view of an automatic call distribution system coupled to an answering machine detection system according to one aspect of the system and method of present disclosure. ACDS 1, short for Automatic Call Distribution System, is an electronic device or software that automatically dials telephone numbers and distributes calls to internal communication devices throughout the system. Once an outbound call has been answered, ACDS 1 either plays a recorded message or connects the call to Agent 5. ACDS 1 may be one of many types of dialing distribution systems, such as, but not limited to a predictive dialer, a power dialer, an auto dialer or a smart dialer. ACDS 1 may be located in various places without affecting the systems functionality. ACDS 1 may be embodied within or attached to a local private branch exchange, or a hosted/virtual private branch exchange. ACDS 1 may be managed internally by a company, or may be managed and hosted by a telecom network. ACDS 1 may contain Main Memory 3, Central Control Processing Unit 4, and Multiport Switch 2. ACDS 1 may be connected to a host computer system (not shown) that may transmit out dialing information to Central Control Processing Unit 4. The Multiport Switch 2 operates under the control of Central Control Processing Unit 4 in conjunction with Main Memory 3 to selectively interconnect telephonic calls between Agent 5 at Internal Communication Device 6 and Target Party 12 at External Communication Device 11 via Network Communication 14. As used herein, Agent 5 may be a representative of a company, call center or a telecom network that owns or is in control of Internal Communication Device 6 (e.g. landline, VoIP phone, VoIP softphone). Target Party 12 may be a user or customer who owns or is in control of External Communication Device 11 (e.g. landline, VoIP phone, VoIP softphone). Network Communication 14 is a communications link between Agent 5 and Target Party 12. Upon connection, data such as voice may be transmitted through Network Communication 14 from Agent 5 to Target Party 12 and vice versa. This connection may be, but is not limited to a physical connection, such as through the Public switched telephone network (PSTN) or a virtual connection, such as through Voice over internet protocol (VoIP).

Target Party 12 may have Voicemail Response Unit 13 for example, connected to or embedded within External Communication Device 11, such as an answering machine, or may be a voicemail service provided by a third party. Voicemail Response Unit 13 may respond to the call from ACDS 1 if Target Party 12 does not answer the call. If Target Party 12 answers the call at External Communication Device 11, then Target Party 12 may emit an audio signal through Network Communication 14 to ACDS 1. Prior to distributing said audio signal from External Communication Device 11 to Internal Communication Device 6 through Multiport Switch 2, Multiport Switch 2 directs the emitted audio signal to AMDS 7. AMDS 7, short for Answering Machine Detection System, may be in communication with or embedded within ACDS 1 and may be employed to monitor communications via Network Communication 14 upon the connection of the call. AMDS 7 is equipped with sound recording software or hardware that records the emitted audio signal provided via Network Communication 14. AMDS 7 then utilizes embodied processors (not shown) to analyze the audio signal received via Network Communication 14 into vector values. Vector values are one dimensional linear arrays, which, when interpreted from an audio file or signal, communicate features and strings of an audio signal into a vector value that may be compared to other vectors for resemblances and differences. AMDS 7 may feature Database 8 in which these vectors are stored. Database 8 may be coupled to or embodied within AMDS 7, among other locations, such as within ACDS 1, Main Memory 3, or within a carrier network. AMDS 7 may filter the vectors into a variety of possible formations, such as Pre-recorded Vectors 9 and Live Vectors 10. In this aspect, once AMDS 7 determines the type of vector; pre-recorded or live, the vector is classified within Database 8. When AMDS 7 interprets emitted live audio signal from External Communication Device 11 into a vector value, it will then compare this vector value with stored vector values within Database 8. Once a match is found, in either Pre-recorded Vectors 9, or Live Vectors 10, AMDS 7 is able to determine whether the audio signal emitted is pre-recorded or live. AMDS 7 then relays this information to Multiport Switch 2, potentially through the use of an API. Based on the type of audio signal emitted, Multiport Switch 2 may direct the call to Agent 5, terminate the call, or play a pre-recorded message to Target Party 12. In this aspect, AMDS 7 may compare a vector to a large quantity of stored vectors in Database 8. The stored vectors may be available to and used in comparisons by other campaigns or customers. As the number of stored vectors in Database 8 grows, the system becomes more useful in identifying live audio or pre-recorded messages.

In one aspect of the present disclosure, AMDS 7 may filter the data stored within Database 8 based on Target Party 12 being contacted. A series of filtering processes may be triggered by AMDS 7, based on data received from ACDS 1 via Multiport Switch 2 (e.g. call detail record, party identifying information, number portability data). This data received from ACDS 1 may contain Target Party's 12 phone number, information related to a telephone call, such as the origination and destination addresses of the call, the time the call started and ended, the duration of the call, language spoken by Target Party 7, the time of day the call was made, and any toll charges that were added through the network or charges for operator services, among other details of the call. With this data, AMDS 7 may be able to sort through vectors that are associated with the specific Target Party 12, which may potentially expedite the process by limiting the search process. In this aspect, if the audio signal emitted received via Network Communication 14 is from Voicemail Response Unit 13, then AMDS 7 may be able to find the match within Pre-recorded Vectors 9 database associated with Target Party 12 immediately because the match is very close and there may only be one vector to compare the newly interpreted vector to. In the case that there is no prior data or history presently associated to Target Party 12, AMDS 7 records the emitted audio signal transmitted via Network Communication 14, interprets the emitted audio signal into a vector value and then may use other answering machine detection practices (e.g. greeting timer, pause timer), to determine the presence of Voicemail Response Unit 13 or Target Party 12. If the type of audio signal emitted is successfully determined, then the vector value interpreted by AMDS 7 is distributed to the database associated with Target Party 12, which may be either Pre-recorded Vectors 9 database or Live Vectors 10 database.

It will be understood by those skilled in the art that due to the biometric methods that are employed to determine pre-recorded audio and live audio, initial scans of the database upon interpreting an audio recording into a vector value, may not result in a successful match. Once multiple vector values are classified within Database 8 for any given Target Party 12, the likelihood of deciphering the difference between pre-recorded audio and live audio increases. In one aspect of the present disclosure, speaker identification methods may be employed by AMDS 7 (not shown). Speaker identification methods are used to determine an unknown speaker's identity (e.g. 1:N comparison). The vector value associated with the unknown speaker is compared against multiple voice prints, templates, or models to find a match. When a shared External Communication Device 11 is answered by different people, AMDS 7 may employ speaker recognition processors (not shown) to recognize the speaker based on voice characteristics that have been predisposed to AMDS 7 (e.g. 1:1 comparison). In this scenario, AMDS 7 may determine the speaker on External Communication Device 11 is not the intended Target Party 12 and may terminate the call to increase efficiency within ACDS 1.

In another aspect of the present disclosure, AMDS 7 may be embedded or coupled to a telecom network. In this aspect, the larger the telecom network, the more successful and accurate AMDS 7 may be, because the efficacy of AMDS 7 may improve as the number of processed calls increases. This in turn allows for a more extensive scan of logged vector values within Database 8, in search for characteristics that help define the pre-recorded audio and live voice. In this aspect, the data located within the telecom network may be easily accessible through business phone systems such as a virtual or hosted private branch exchange, making the Database 8 readily available to a large majority of call centers across the U.S. and abroad that are currently using the system of the present disclosure. With each call center that accesses and provides data to the AMDS 7 located within said telecom network, the larger and more useful Database 8 becomes.

Figure 2:
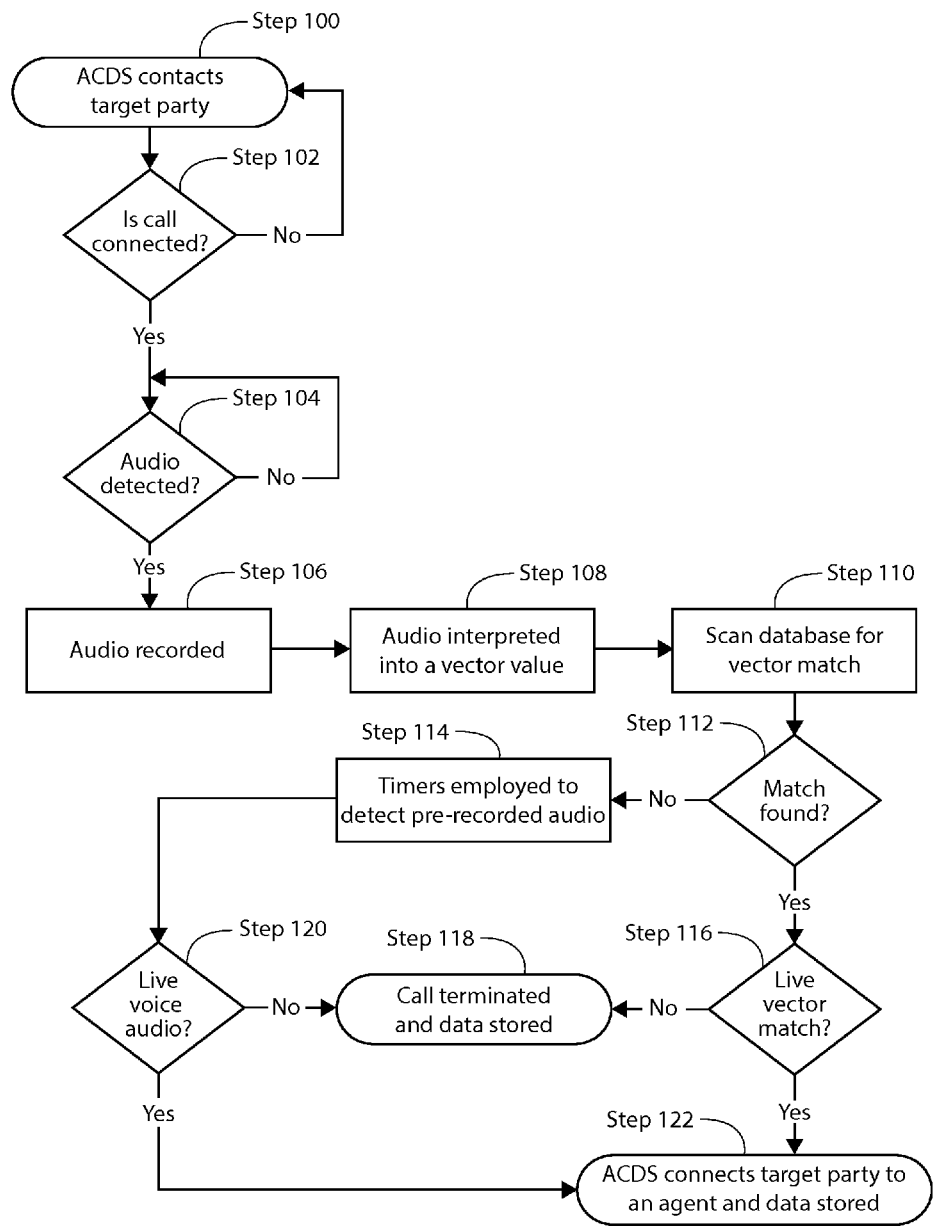
FIG. 2 is a process flow regarding an automatic call distribution system coupled to an answering machine detection system according to one aspect of the system and method of present disclosure.

FIG. 2 is a process flow regarding an automatic call distribution system coupled to an answering machine detection system according to one aspect of the system and method of present disclosure. In Step 100, ACDS 1 dials out through Network Communication 14 to External Communication Device 11 of Target Party 12. If the call is connected (Yes, Step 102), Multiport Switch 2 directs the call to AMDS 7. AMDS 7 is employed to monitor the External Communication Device 11 for potential emitted audio signals at Step 104. If the call is not connected (No, Step 102), then ACDS 1 may attempt to contact Target Party 12 again in Step 100 or terminate the call. This decision may be determined by the ISDN cause codes emitted by Target Party's 12 External Communication Device 11 prior to the connection of the call. An ISDN cause code will indicate an ISDN-specific error, or indicate current ISDN activity of External Communication Device 12, which could indicate if External Communication Device 11 is an active or non-active line.

If an audio signal is detected by AMDS 7 (Yes, Step 104), then the emitted audio signal is recorded by processors embodied within AMDS 7. If an audio signal is not detected by AMDS 7 (No, Step 104), then AMDS 7 may continue to scan for audio until it is detected. In one aspect of the present disclosure (not shown), a timer may be utilized to end this process at some point, which may be set by the operator of ACDS 1, when no audio signal is detected. If no audio is detected after the completion of the timer, then the call may be terminated by ACDS 1.

Once the emitted audio signal received from Network Communication 14 has been recorded by AMDS 7 at Step 106, the audio file may be interpreted into a vector value at Step 108. The interpretation of the audio signal emitted into a vector value may be performed in a variety of currently known methods. The processes which take place within AMDS 7 are not novel concepts and are clearly described within U.S. patent application Ser. No. 09/533,045, entitled "Method for Creating a Database for Comparing Music Attributes," filed on Mar. 22, 2000; U.S. patent application Ser. No. 08/897,662, entitled "Method and article of manufacture for content-based analysis, storage, retrieval, and segmentation of audio information," filed on Jul. 21, 1997; U.S. patent application Ser. No. 09/695,457, entitled "Method and system for analyzing digital audio files," filed on Oct. 24, 2000. Once a vector value has been interpreted at Step 108, this vector value may be compared against other vector values found within Database 8 for a match during Step 110.

A match may be classified as an exact representation of a vector value already located within Database 8, or the required quality of the match may be set by the ACDS 1. For example, if the newly interpreted vector value is an 80% match or greater to a vector value located in Database 8, based on data generated by the processors within AMDS 7, then ACDS 1 may consider the newly interpreted vector value to be a match and distribute the call accordingly. This required percentage match may be set by the operator of ACDS 1 or an Agent 5.

If a match is found (Yes, Step 112), then AMDS 7 informs ACDS 1 of the type of match found during Step 116. If no match is found (No, Step 112), standard methods for detecting the presence of a Voicemail Response Unit 13 are utilized, such as greeting timers and pause timers, these timers may be deployed to determine the presence of pre-recorded audio or live audio at Step 114. If the standard methods for detecting the presence of a Voicemail Response Unit 13 indicate that audio emitted from External Communications Device 11 is live voice audio (Yes, Step 120), then Multiport Switch 2 within ACDS 1 connects Target Party 12 to Agent 5 through Network Communication 14 and stores the vector associated with the audio with Live Vectors 10 within Database 8 at Step 122.

If the newly interpreted vector value matches Live Vector 10 within Database 8 (Yes, Step 116), it may indicate External Communication Device 11 was answered by Target Party 12, and not Voicemail Response Unit 13. In that case, Multiport Switch 2 within ACDS 1 then connects Target Party 12 to Agent 5 through Network Communication 14 and stores the vector associated with the audio with Live Vectors 10 within Database 8 at Step 122.

If the audio recorded in Step 106 is determined to be pre-recorded audio by the timers employed (not shown) during Step 114, then it may indicate External Communication Device 11 was answered by Voicemail Response Unit 13, (No, Step 120). The call may then be terminated or an automated message may be played at Step 118, and the vector associated with the pre-recorded audio is stored within Pre-recorded Vectors 9 within Database 8.

If the newly interpreted vector matches a Pre-recorded Vector 9 within Database 8 (No, Step 116), it may indicate External Communication Device 11 was answered by Voicemail Response Unit 13. As a result, at Step 118 the call may be terminated by ACDS 1 or an automated message may be played by ACDS 1 to be delivered to Target Party 12 and may store the vector within Database 8 and designate that it is a Pre-recorded Vector 9.

It is to be understood by those skilled in the art that the processes and methods described herein may be performed in a multitude of sequences, they are not to be limited to what is displayed within FIG. 2.

Figure 3:
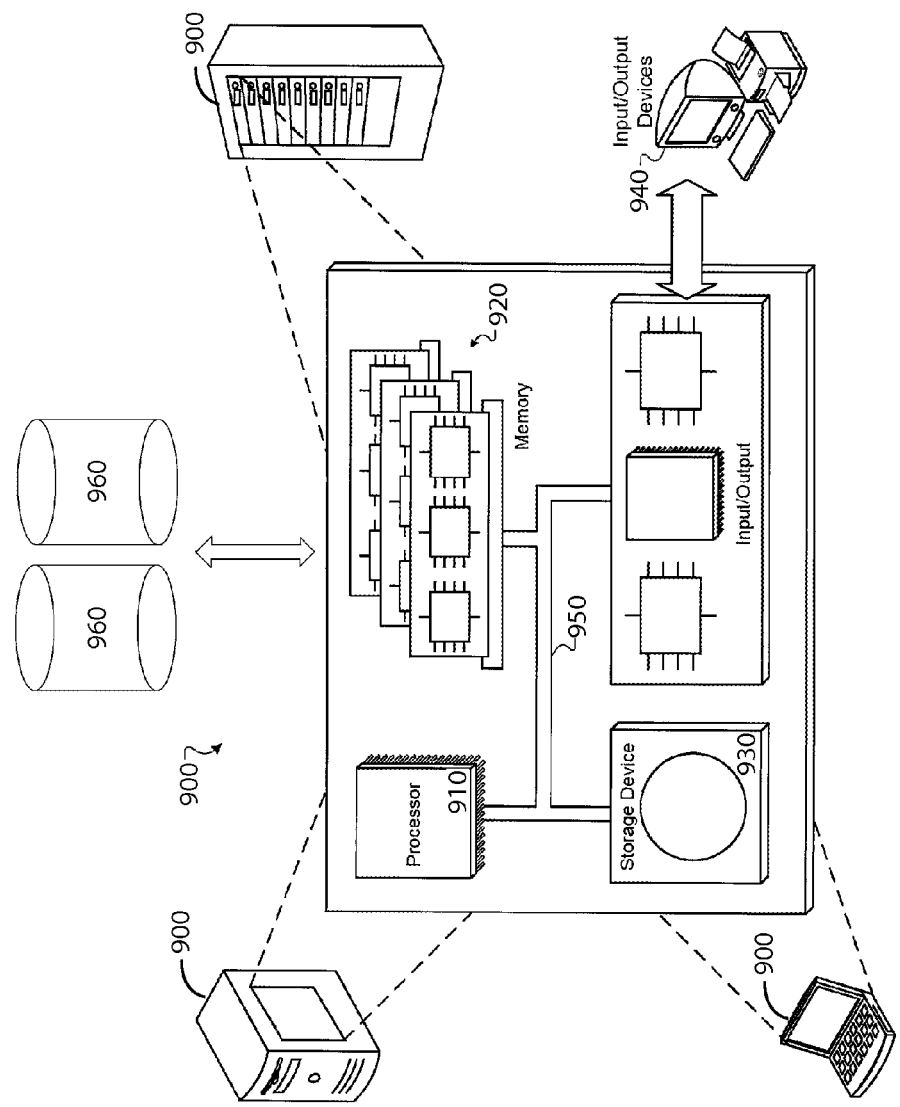
FIG. 3 is a diagram displaying a general purpose computer on which the system and method of the present disclosure may be implemented according to an aspect of present disclosure.

FIG. 3 is a diagram displaying a general purpose computer on which the system and method of the present disclosure may be implemented according to an aspect of present disclosure. The computer system 900 may execute at least some of the operations described above. Computer system 900 may include processor 910, memory 920, storage device 930, and input/output devices 940. Some or all of the components 910, 920, 930, and 940 may be interconnected via system bus 950. Processor 910 may be single or multi-threaded and may have one or more cores. Processor 910 may execute instructions, such as those stored in memory 920 or in storage device 930. Information may be received and output using one or more input/output devices 940.

Memory 920 may store information and may be a computer-readable medium, such as volatile or non-volatile memory. Storage device 930 may provide storage for system 900 and may be a computer-readable medium. In various aspects, storage device 930 may be a flash memory device, a floppy disk device, a hard disk device, an optical disk device, or a tape device.

Input/output devices 940 may provide input/output operations for system 900. Input/output devices 940 may include a keyboard, pointing device, and microphone. Input/output devices 940 may further include a display unit for displaying graphical user interfaces, speaker, and printer. External data, such as financial data, may be stored in accessible external databases 960.

The features described may be implemented in digital electronic circuitry, or in computer hardware, firmware, software, or in combinations thereof. The apparatus may be implemented in a computer program product tangibly embodied in an information carrier, e.g., in a machine-readable storage device or in a propagated signal, for execution by a programmable processor; and method steps may be performed by a programmable processor executing a program of instructions to perform functions of the described implementations by operating on input data and generating output.

The described features may be implemented in one or more computer programs that are executable on a programmable system including at least one programmable processor coupled to receive data and instructions from, and to transmit data and instructions to, a data storage system, at least one input device, and at least one output device. A computer program may include set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors of any kind of computer. Generally, a processor may receive instructions and data from a read only memory or a random access memory or both. Such a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable, disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks may include, e.g., a LAN, a WAN, and the computers and networks forming the Internet.

The computer system may include clients and servers. A client and server may be remote from each other and interact through a network, such as the described one. The relationship of client and server may arise by virtue of computer programs running on the respective computers and having a client-server relationship to each other.

Numerous additional modifications and variations of the present disclosure are possible in view of the above teachings. It is therefore to be understood that within the scope of the appended claims, the present disclosure may be practiced other than as specifically described herein.

The invention claimed is:

1. A computer system for processing audio on a call, comprising:
  a processor in communication with non-volatile memory, the non-volatile memory comprising:
  code for instructing the processor to detect audio on the call;
  code for instructing the processor to record audio on the call and to convert the recorded audio into a vector, where the vector comprises values that are a digital representation of the recorded audio;
  code for instructing the processor to compare the recorded audio vector with a plurality of audio vectors stored in a database and to generate a comparative match number for each comparison, where each of the plurality of audio vectors is designated as live-voice or prerecorded;
  code for instructing the processor to identify a closest audio vector having a highest comparative match number above a predetermined threshold match number;
  code for instructing the processor to connect the call to an agent when the closest audio vector is designated as live-voice and to store the recorded audio vector in the database with live-voice designation; and
  code for instructing the processor to store the recorded audio vector in the database with pre-recorded designation when the closest audio vector is designated as pre-recorded.

2. The system of claim 1, further comprising code for instructing the processor to determine no match when a highest comparative match number is below the predetermined threshold value, then using one or more timers to determine whether the recorded audio contains live-voice or pre-recorded audio.

3. The system of claim 2, further comprising code for instructing the processor to store the recorded audio vector in the database with live-voice or pre-recorded designation.

4. The system of claim 1, further comprising code for instructing the processor to disconnect the call when the closest audio vector is designated as pre-recorded.

5. The system of claim 4, further comprising code for instructing the processor to play an audio message on the call before disconnecting the call.

6. The system of claim 1, further comprising code for instructing the processor to play a n audio message on the call before connecting the call.

7. The system of claim 1, further comprising code for instructing the processor to store call information in the database and to associate the call information with the recorded audio vector.

8. The system of claim 7, wherein the call information comprises at least one of calling party phone number, called party phone number, call start time, call end time, call duration, language spoken, and charges.

9. The system of claim 7, wherein the code for instructing the processor to identify the closest audio vector uses stored call information.

10. A computer system for processing audio on a call, comprising:
  a processor in communication with non-volatile memory, the non-volatile memory comprising:
  an audio detection system in electrical communication with a database, the audio detection system capable of detecting audio on the call;
  recording audio on the call;
  converting the recorded audio into a vector, where the vector comprises values that are a digital representation of the recorded audio;
  comparing the recorded audio vector with a plurality of audio vectors stored in the database and generating a comparative match number for each comparison, where each of the plurality of audio vectors is designated as live-voice or pre-recorded; and
  identifying a closest audio vector having a highest comparative match number above a predetermined threshold match number;
  a call distribution system in electrical communication with the audio detection system, the database, and a communication network, the call distribution system capable of placing the call;
  connecting the call to an agent when the closest audio vector is designated as live-voice and storing the recorded audio vector in the database with live-voice designation; and storing the recorded audio vector in the database with pre-recorded designation when the closest audio vector is designated as pre-recorded.

11. The computer system of claim 10, wherein the audio detection system is further capable of determining no match when a highest comparative match number is below the pre-determined threshold value, then using one or more timers to determine whether the recorded audio contains live-voice or pre-recorded audio.

12. The computer system of claim 11, wherein the audio detection system is further capable of storing the recorded audio vector in the database with live-voice or pre-recorded designation.

13. The computer system of claim 10, wherein the call distribution system is further capable of disconnecting the call when the closest audio vector is designated as pre-recorded.

14. The computer system of claim 13, wherein the call distribution system is further capable of playing an audio message on the call before disconnecting the call.

15. The computer system of claim 13, wherein the call distribution system is further capable of playing an audio message on the call before connecting the call.

16. The computer system of claim 10, wherein the audio detection system is further capable of storing call information in the database and associating the call information with the recorded audio vector.

17. The computer system of claim 16, wherein the call information comprises at least one of calling party phone number, called party phone number, call start time, call end time, call duration, language spoken, and charges.

18. The computer system of claim 16, wherein the audio detection system is capable of identifying the closest audio vector using stored call information.

* * * * *